United States Patent [19]

Prunesti et al.

[11] Patent Number: 4,776,916
[45] Date of Patent: Oct. 11, 1988

[54] METHOD AND APPARATUS FOR PROVIDING ADDITIONAL SUPPORT TO SELECTED PORTIONS OF A GARMENT

[75] Inventors: James Prunesti, New Providence, N.J.; William D. Bell, Tuxedo Park, N.Y.; Jane P. Gannaway, Mahwah, N.J.; Anthony Tedeschi, Highland Lakes, N.J.

[73] Assignee: Playtex Apparel, Inc., Stamford, Conn.

[21] Appl. No.: 76,097

[22] Filed: Sep. 2, 1987

Related U.S. Application Data

[62] Division of Ser. No. 891,719, Jul. 29, 1986, Pat. No. 4,701,964.

[51] Int. Cl.[4] .............................................. B32B 31/12
[52] U.S. Cl. ................................... 156/291; 156/548; 156/578; 198/688.1; 428/198
[58] Field of Search ............... 156/230, 231, 234, 291, 156/548, 578; 428/198; 2/406; 450/40; 198/688.1

[56] References Cited

U.S. PATENT DOCUMENTS

| | | |
|---|---|---|
| 2,915,067 | 12/1959 | Bracht . |
| 2,956,916 | 10/1960 | Voss et al. . |
| 2,975,428 | 3/1961 | Pfeffer, Jr. et al. . |
| 3,002,849 | 10/1961 | Harmon et al. . |
| 3,021,344 | 2/1962 | Flagg et al. . |
| 3,228,401 | 1/1966 | Byrne . |
| 3,251,727 | 5/1966 | Reynolds et al. ............... 156/291 X |
| 3,317,645 | 5/1967 | Nirenberg . |
| 3,320,346 | 5/1967 | Galitzki et al. . |
| 3,361,245 | 1/1968 | Ladney ........................ 198/688.1 X |
| 3,383,263 | 5/1968 | Storti . |
| 3,489,154 | 1/1970 | Kaspar et al. . |
| 3,502,522 | 3/1970 | Adamoli . |
| 3,644,157 | 2/1972 | Draper . |
| 3,676,269 | 7/1972 | Schaetti ........................ 156/291 X |
| 3,682,738 | 8/1972 | Smith . |
| 3,750,673 | 8/1973 | Penrock . |
| 3,919,039 | 11/1975 | Rohner . |
| 4,096,016 | 6/1978 | Pohl . |
| 4,097,629 | 6/1978 | Schneider . |
| 4,139,613 | 2/1979 | Hefele . |
| 4,172,002 | 10/1979 | Gluckin . |
| 4,248,923 | 2/1981 | Ciobanu et al. ............... 156/291 X |
| 4,372,321 | 2/1983 | Robinson . |
| 4,375,445 | 3/1983 | Cole et al. . |
| 4,419,997 | 12/1983 | Cole et al. . |
| 4,558,705 | 12/1985 | O'Boyle et al. . |

FOREIGN PATENT DOCUMENTS 1291726  3/1961  France .

Primary Examiner—Robert A. Dawson
Attorney, Agent, or Firm—Stewart J. Fried

[57] ABSTRACT

Method and apparatus are provided for applying a thermoplastic adhesive to a portion of a garment in a predetermined pattern. The portion of the garment is initially loaded onto a conveyor device through a loading fixture and a powdered adhesive is screen printed onto said portion in a predetermined pattern. The adhesive is cured in a drying oven and permitted to cool. A cover panel is then placed over the adhesive and the cover panel is fused to that portion of the garment at elevated temperature and pressure. The resultant garment, preferably a woman's undergarment, possesses the combination of unique control, support, shape and aesthetic characteristics.

11 Claims, 4 Drawing Sheets

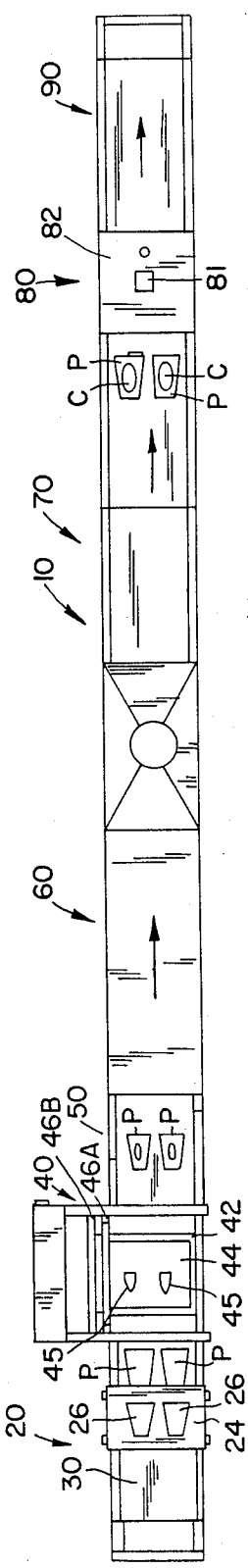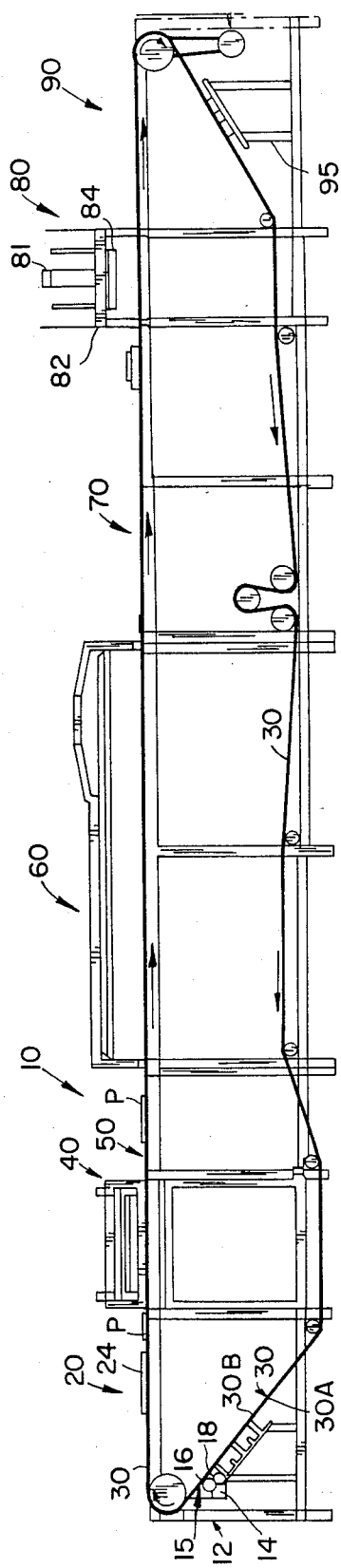

FIG. 6A
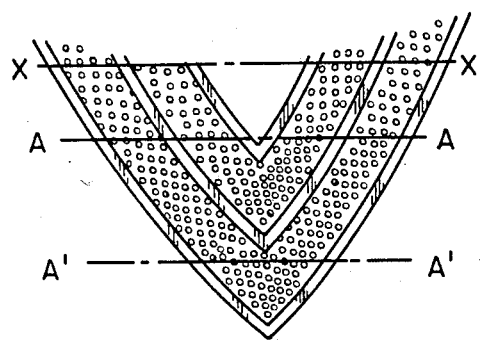
FIG. 6B
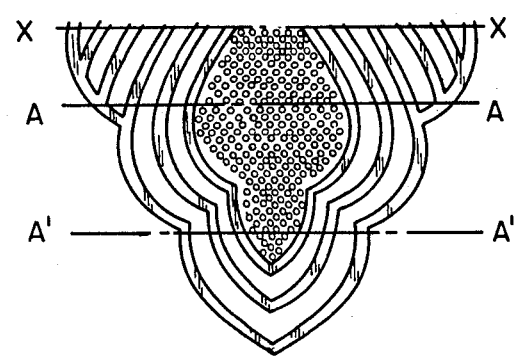
FIG. 5
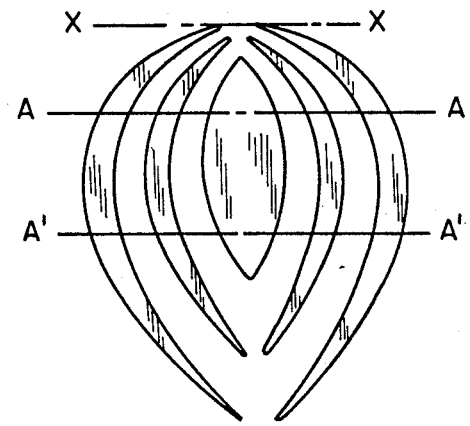
FIG. 6C

METHOD AND APPARATUS FOR PROVIDING ADDITIONAL SUPPORT TO SELECTED PORTIONS OF A GARMENT

This is a divisional of co-pending application Ser. No. 891,719 filed on July 29, 1986 now U.S. Pat. No. 4,701,964.

BACKGROUND OF THE INVENTION

1. Field of the Invention

The present invention relates generally to method and apparatus for providing additional support or control to selected portions of a garment and the resultant garment produced thereby and, more particularly, to such method and apparatus which is adapted to apply an adhesive material to selected portions of a garment to provide a generally pleasing aesthetic pattern as well as support or control in such selected portions.

2. Description of the Related Art

The reinforcing or stiffening of selected portions of a garment, particularly an undergarment, is generally well known. Certain undergarments, including brassieres, corsets, girdles, and the like, require the reinforcement or stiffening of certain selected portions thereof in order to permit them to function properly. This is particularly true with respect to garments made from stretchable synthetic knitted fabrics utilizing polyester and nylon.

For example, some brassiere types need some form of reinforcement or stiffening elements to provide support for the wearer. Such means include metal underwires, plastic undershapers and stays. An example of a brassiere selectively reinforced in the breast cup area is described in U.S. Pat. No. 3,021,844, which issued on Feb. 20, 1962 to Flagg et al., and which discloses the use of a stiffening liner in the breast cups of the brassiere. U.S. Pat. No. 3,750,673, which issued on Aug. 7, 1983 to Penrock, is similarly directed to a brassiere having a plurality of plastic stays positioned below the cup portion. Further, U.S. Pat. No. 4,558,705, which issued on Dec. 17, 1985 to O'Boyle et al. and which is owned by the assignee of the present application, relates to a brassiere which includes a unique plastic support.

With the advent of composite fabrics, there has been a trend toward incorporating stiffening panels or inserts as part of the composite fabric to provide selective reinforcement or stiffening. For example, U.S. Pat. No. 2,915,067, which issued on Dec. 1, 1959 to Bracht, is directed to a body supporting garment having a laminated structure, which includes a pair of flexible layers and a flexible stiffening member therebetween. U.S. Pat. No. 4,172,002, which issued on Oct. 23, 1979 to G. Gluckin, is directed to a brassiere having a support patch integrally molded into its breast cup. Similarly, U.S. Pat. No. 4,372,321, which issued on Feb. 8, 1983 to Robinson, provides a brassiere which has a unitary molded breast cup which includes an intermediate panel which is adhesively bonded to the cup in order to provide additional reinforcement or support for the cup. See also, U.S. Pat. Nos. 4,375,445 and 4,419,997, which issued, respectively, on Mar. 1, 1983 and Dec. 13, 1983 to R. Cole et al. Both patents are owned by the assignee of the present application, and are directed to brassieres having a non-stretchable crown portion and a substantially non-stretchable longitudinal cup portion.

Analogously, U.S. Pat. No. 3,317,645, which issued on May 2, 1967 to Nirenberg, and U.S. Pat. No. 3,320,346, which issued on May 16, 1967 to Galitzki et al. provide methods for forming laminated or molded articles having these layers with the intermediate layer made of plastic. U.S. Pat. No. 3,383,263, which issued on May 14, 1968 to Storti, is directed to a method of preparing fabric laminate, by laminating two fabrics by means of regularly recurring spaced geometric units of substantially dry adhesive film sandwiched between the matting surfaces of the fabrics.

The selective reinforcement of portions of panties and baby pants, and methods and apparatus for such reinforcement, are also known. For example, U.S. Pat. No. 3,228,401, which issued on Jan. 11, 1966 to Byrne, is directed to a foundation garment having reinforced panels. In order to effect such reinforcement, paste is applied to one or more panels of the fabric by a silk screen technique. Specifically, the paste is passed between the threads of the fabric in the selected or patterned areas so as to permit the plastic to become embedded in the threads.

Similarly, U.S. Pat. No. 3,644,157, which issued on Feb. 22, 1972 to Draper, provides a method for selectively fusing a first finished panel to an intermediate panel of elastic material at selected locations. French Pat. No. 1,291,726, which issued on Mar. 19, 1962 to Girodet, is directed to undergarments, including girdles and corsets, in which strips of stiffening ribbons are fused to selected portions of the garments. Analogously, U.S. Pat. No. 3,502,522, which issued on Mar. 24, 1970 to Adamoli, provides a method and apparatus for manufacturing baby pants in which pieces of plastic material are welded to the body portions thereof.

Further, U.S. Pat. No. 3,682,738, which issued on Aug. 8, 1972 to Smith, provides method and apparatus for depositing powdered materials in patterned areas on textile and sheet materials. The material is then laminated to separate fabrics using heated, laminating rollers. Also, U.S. Pat. No. 3,489,154, which issued on Jan. 13, 1970 to Kasper, et al. and which is owned by the assignee of the present application, relates to a composite sheet material used to make foundation-type garments having a thin, inner panel bonded to outer fabric panels which include at least one thin, stretch fabric so as to limit the stretchability of the laminated fabric.

Other types of garments which include reinforced or stiffened portions are the collar portions of shirts and jackets, as disclosed, for example in U.S. Pat. No. 2,975,248, which issued on Mar. 21, 1961 to Pfeffer, Jr. et al., and safety helmets as disclosed, for example, in U.S. Pat. No. 2,956,916, which issued on Oct. 18, 1960 to Voss et al.

Still further, apparatus and methods for applying thermoplastic bonding materials to garments using screen printing techniques are also well known. For example, U.S. Pat. No. 3,002,849, which issued on Oct. 3, 1961 to Harmon et al., provides method and apparatus for forming a non-woven fabric. A thermoplastic bonding material is screen printed onto a substrate and then heated to fuse the material to the substrate. Similarly, U.S. Pat. No. 3,676,269, which issued on July 11, 1972 to Schaetti and which may be somewhat analogous to the U.S. Pat. No. 3,682,738 to Smith, provides a method of laminating a powdered thermoplastic material to a substrate which may, thereafter, be laminated to another fabric. See also, U.S. Pat. Nos. 3,919,039, which issued on Nov. 11, 1975 to Rohner; 4,096,016, which issued on June 20, 1978 to Pohl; 4,097,629, which issued on June 27, 1978 to Schneider; and 4,139,613, which issued on Feb. 13, 1979 to Hefele, all of which provide various forms of a laminating apparatus.

SUMMARY OF THE INVENTION

It is a primary object of the present invention to provide method and apparatus for providing additional control to selected portions of a garment.

It is another object of the present invention to provide a garment which includes selectively supported portions adapted to provide additional control to the wearer.

It is yet another object of the present invention to provide such method and apparatus wherein an adhesive and a panel are applied to selected portions of a garment so as to provide such additional control.

It is still another object of the present invention to provide such method and apparatus wherein the adhesive is applied to selected portions of a garment in an aesthetically pleasing pattern.

It is a further object of the present invention to provide such a garment wherein such selectively supported portions are aesthetically attractive.

It is still a further object of the present invention to provide such a garment in which such selectively supported portions are adapted to provide additional control and an aesthetically pleasing effect, yet permit the garment to maintain optimal fit and performance.

It is yet another object of the present invention to provide an undergarment, such as a brassiere, girdle or panty, which includes such selectively supported portions.

It is still yet another object of the present invention to provide an undergarment such as a slip, camisole, swimsuit, bodysuit, leotard, tights, stretch pants, or pair of pantyhose, as disclosed, for example in U.S. Pat. No. 2,975,248, which issued on Mar. 21, 1961 to Pfeffer, Jr. et al., and safety helmets as.

These and other objects are provided for by a method and apparatus for applying a powdered adhesive to selected portions of a garment. The selected portions are initially placed on a conveyor system through a loading fixture and the adhesive is thereupon screen printed onto the selected portions in a predetermined pattern. Thereafter, the adhesive is cured in a drying oven and permitted to cool. A cover panel is then placed over the adhesive and fused to the garment at elevated temperature and pressure.

The resultant garment possesses the unique combination of selective control or support, while retaining fit, shaping and performance characteristics, and an extremely pleasing aesthetic appearance.

The foregoing and still other objects and advantages of the present invention will be more apparent from the following detailed explanation of the preferred embodiments of the invention.

BRIEF DESCRIPTION OF THE DRAWINGS

FIG. 1 is a side elevational view of the apparatus of the present invention;

FIG. 2 is a top view of the apparatus of FIG. 1;

FIG. 5 is a sectional view taken along line 5—5 of FIG. 3;

FIGS. 6A–6C illustrate alternative patterns which may be used in the panty of FIG. 3.

BRIEF DESCRIPTION OF THE PREFERRED EMBODIMENTS

Figure 3:
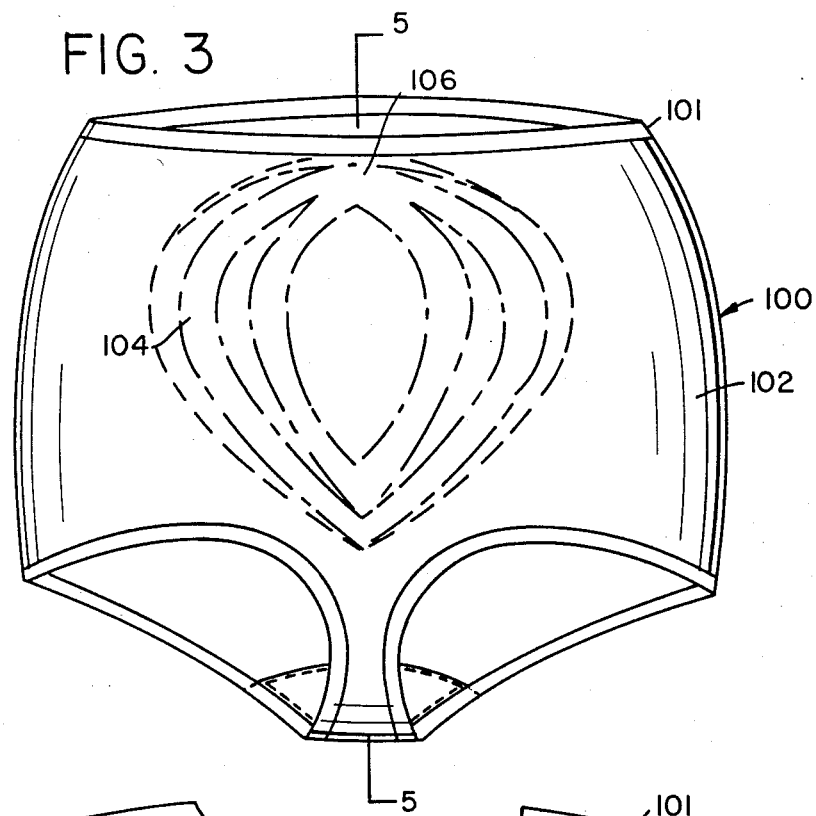
FIG. 3 is a front view of a panty article produced according to the teachings of the present invention.

The apparatus of the present invention, as illustrated in FIGS. 1 and 2, comprises a multi-stage conveyor device, indicated generally by reference numeral 10, which includes a series of stations starting from an applicator station 12 and progressing downstream to a cleaning station 95. Multi-stage conveyor device 10 also includes a continuous conveyor belt 30 fabricated from a material which should be capable of withstanding heat in excess of at least about 350 F. In this regard, conveyor belt 30, which includes outer and inner surfaces 30A and 30B, respectively, is preferably fabricated from spun polyester coated with butyl rubber. In a particularly preferred embodiment, conveyor belt 30 is fabricated from a three ply, 8.9 oz./yd 2 spun polyester with a 0.094" thick coating of butyl rubber.

Applicator station 12 includes tack adhesive applicator means 15 adapted to apply a relatively thin layer of a belt tack adhesive to the outer surface 30A of the conveyor belt 30.

The conveyor device 10 further includes a loading station 20 positioned downstream from the applicator station 12 at which a loading fixture 24 is positioned above the conveyor belt 30. Loading fixture 24 is adapted to facilitate and properly orient placement of base panel or panels P onto the conveyor belt 30. Typically, each base panel comprises the body portion of the garment to be produced. Loading fixture 24 includes at least one and, preferably, two or more pattern portions 26, each of a complimentary size and shape to the base panel P. Each base panel P is fed through the pattern portions 26 of the loading fixture 24 directly onto the conveyor belt 30 in proper alignment and orientation for subsequent operations.

The base panels P are maintained in such proper alignment and orientation during subsequent operations due to the tack adhesive present on the outer surface 30A of the conveyor belt 30, and, if desired, additional manual pressure may be applied at the loading station 20 to smooth out the base panels P prior to further processing.

Tack adhesive applicator means 15 includes a vessel 14 for storing a suitable quantity of a tack adhesive, a transfer roller 16 communicating between the quantity of tack adhesive in the vessel and the outer surface 30A of the conveyor belt 30, and a doctor blade 18 for removing any excess tack adhesive from the outer surface and for smoothing out the tack adhesive which was applied to the conveyor belt 30.

The tack adhesive selected should perform equally well with garments made from cellulosic and synthetic fabrics and must be capable of being easily removed with water from the conveyor belt 30 using conventional, belt washing devices (not shown) which are positioned at cleaning station 95. For this reason, the tack adhesive applied to the conveyor belt 30 at the applicator station 12 is, preferably, a water soluble tack adhesive with excellent green tack properties so as to hold the garment in register with the conveyor belt 30 immediately upon contact therewith. It has been found that a preferred type of tack adhesive is a polyvinyl alcohol based tack adhesive such as, for example, PRINTING ADHESIVE 500 which is available through the Polymer Industries subsidiary of Morton Thiokol, Inc. In a preferred embodiment, the PRINTING ADHESIVE 500 is diluted with water in between a 2:1 and a 5:1 ratio of water to tack adhesive.

After the base panels P are placed in proper alignment on the conveyor belt 30 at the loading station 20, they then travel further downstream to a printing station 40 where a garment adhesive is screen printed onto the base panels P in a predetermined pattern. Printing station 40 includes a printing frame 42 which supports a printing screen 44 and at least one and, preferably, two reciprocating doctor blades 46A and 46B. Printing station 40 also includes conventional means (not shown) for supplying the garment adhesive to the printing frame 42. The supply means, preferably in the form of a supply trough attached to an external source of garment adhesive, must be capable of introducing suitable quantities of the garment adhesive into the printing frame 42. At the time of application, the garment adhesive must be heated to ambient temperature, i.e, between about 65 F. and about 80 F.

The printing screen 44 includes one or more pattern exposures 45 of complimentary configuration and shaped to the pattern to be printed onto the base panels P.

The reciprocating doctor blades 46A and 46B provided in printing station 40 are adapted to travel across the printing frame 42, preferably in a direction perpendicular to the direction of movement of the conveyor belt 30. Travel of the doctor blades 46A and 46B forces the garment adhesive through the pattern exposures 45 in the printing screen 44 thereby printing the garment adhesive directly onto the base panel P positioned on the conveyor belt 30 below the pattern exposures 45.

In a preferred embodiment, the two doctor blades 46A and 46B are reciprocating. During the forward stroke of the blades 46A dna 46B, the rear blade 46B spreads out the garment adhesive over the surface of the screen 44 and, upon its return stroke, the front doctor blade 46A forces the adhesive through the pattern exposures 45 in the screen 44 directly over the base panels P. During its forward stroke, the front doctor blade 46A does not touch the screen 44 and, likewise, during its return stroke, the rear doctor blade 46B does not touch the screen. By such reciprocating action, the doctor blades 46A and 46B are able to more evenly apply the garment adhesive to the base panels P.

It will be appreciated that the pattern exposures 45 of the printing screen 44 can assume numerous sizes, shapes and configurations depending upon the specific application and such configurations can be changed by changing the printing screen 44 employed. It will further be appreciated that the actual thickness of the garment adhesive printed onto the base panels P varies as a function of the amount of garment adhesive in the printing frame 42, and the pressure and direction of movement of the doctor blades 46A and 46B.

A preferred thickness of the garment adhesive which is printed or applied onto the base panels P at printing station 40 is between about 0.010"" and about 0.020" and will vary according to the amount of control or support desired in the finished garment. For example, when only light control is required, the thickness of the adhesive should be between about 0.010" and about 0.015" and, when greater control or support is desired, the thickness of the adhesive should increase to between about 0.015" and about 0.020".

The garment adhesive applied onto the base panels P at the printing station 40 is a screen printable, thermoplastic adhesive. The particle size of the garment adhesive must be less than or equal to 80 microns in order to permit it to be screen printed.

In a preferred embodiment, the copolymer adhesive is a hot melt powdered adhesive mixed in combination with a pigment, preferably titanium dioxide, and a coloring agent, preferably blueing, with the copolymer adhesive included in an amount up to about 99% by weight, the pigment in an amount up to about 0.965% by weight, and the coloring agent in an amount up to about 0.035% by weight.

The actual copolymer adhesive selected as the garment adhesive is a function of the fabric of the base panel P. A copolyamide adhesive is preferable for use with nylon materials, and a particularly preferred type of copolyamide adhesive is Griltex 2P1 which is marketed by Emser Industries in Sumter, South Carolina, Griltex 2P1 is a copolymer of caprolactam, omega-laurylactam, hexamethylenediamine adipate which does not include any plasticizers.

A copolyester adhesive is preferred for use with polyester materials, preferably one which does not contain any plasticizers, and a particularly preferred type of copolyester hot melt adhesive is Griltex 6P1 which is a copolyester adhesive marketed by Emser Industries.

The pigment is needed because it acts as a dry lubricant in the screen printing processing and is an optical brightener, thereby providing desired visual or aesthetic effects in the finished garment. However, it has been found that too much titanium dioxide pigment, such as amounts greater than about 5%, causes adhesive separation. In fact, the higher the amount of titanium dioxide in the above combination, the lower the resistance of the resultant adhesive bond to cracking and delaminating. Accordingly, the actual amount of titanium dioxide included in the adhesive composition must be carefully controlled. For example, it has been found that for woman's nylon panties, tantanium dioxide should be present in an amount between about 0.5% and about 2.0% by weight and, preferably, in an amount between about 0.90% and about 1.0% by weight.

The preferred type of titanium dioxide pigment is Zopaque R-69, which is marketed by SCM Corporation of Baltimore, MD, and which meets the ASTM Specification D476-72, Type II.

The coloring agent serves to provide a clearer contrast between regions with, and regions without, the adhesive. A preferred type of coloring agent is blueing, preferably Cloissone Blue, which is a lustrous blue powder of platelets of mica coated with titanium dioxide and ferric ferrocyanide, and is marketed by The Mearl Corporation.

It should be noted that in order to obtain desired aesthetic affects, minor amounts of other pigments and coloring agents may be used.

After the garment adhesive is printed onto the base panels P at the printing station 40, the conveyor belt 30 then causes the base panels P to be moved downstream to a staging area 50 which is positioned between the printing station 40 and a downstream drying oven 60. A primary purpose of the staging area 50 is to physically separate the printing station 40 from the drying oven 60 and thereby prevent any heat damage during the screen printing operation at the printing station 40.

The movement of the conveyor belt is incremental to assure that each panel on the conveyor belt remains at each station for a specific period of time. Accordingly, conventional indexing is used with the specific index time based on the specific positioning and length of each predetermined station so that each step in the operation is coordinated.

The conveyor belt 30 then delivers the printed panels P to a conventional drying oven 60 where the garment adhesive applied at the printing station 40 is cured, but not embedded into the fabric. Specifically, the drying oven 60, which is maintained at a temperature between about 900 F. and about 1000 F. and, preferably, between about 920 F. and about 960 F., serves to sufficiently heat the garment adhesive so as to cause it to set up on the surface of the base panel P but not get embedded in the interstices of the fabric.

It has been specifically found for woman's nylon panties, that when the base panels P are passed through a drying oven 60 which is maintained at a temperature of between about 920 F. and about 960 F. for between about 10-15 seconds and, preferably, for about 12 seconds, the base panels P are heated to a temperature between about 290 F. and about 320 F.

The thickness of the garment adhesive printed onto the base panels P is, after drying, between about 0.011" and about 0.018". For light control panty garments, the thickness is preferably between about 0.011" and about 0.014". For moderate control panty garments, the thickness should be between about 0.013" and about 0.016" and, for firm control panty garments, the thickness should be between about 0.015" and about 0.018".

The base panels P are then moved further downstream on the conveyor belt 30 to a loading station 70 where the base panels P are permitted to cool to approximately ambient temperature. At loading station 70, a cover panel C of a fabric complimentary to that of base panel P is applied over the portion of the base panel P on which the garment adhesive has been printed. The cover panel C may be applied to the base panel P either manually or through the use of an automatic loading device (not shown). The cover panel C generally does not extend more than about one quarter inch and, preferably, less than one eighth inch beyond the printed portion of the base panel P.

The base panel P now including the cover panel C is then moved by the conveyor belt 30 to a fusing station 80 where the cover panel C is heat fused to the base panel P at an elevated pressure and temperature to form a control area or control panel on the base panel P. The fusing station 80 includes a fusing press 82 having a press platen 84 which is activated by air supplied through pneumatic cylinders. The press platen 84 is maintained at a temperature of between about 300 F. and about 350 F., preferably at a temperature between about 315 F. and about 340 F. Generally, fusing of the cover panel C and the base panel P is effected at a pressure of between about 25 psi and about 75 psi and, preferably, at a pressure between about 25 psi and about 55 psi. The fusing dwell time is, typically, between about 10 and about 20 seconds and, preferably, about 12 seconds. However, the actual fusion temperature and pressure will depend upon the fabrics and thickness of the adhesive, and the amount of control or support required.

It has been found that for panty garments having the fabrics and the thickness of adhesive described above and in which light control is achieved, the fusing press temperature should be between about 318 F. and about 322 F., the fusing pressure between about 28 psi and about 32 psi, and the fusing dwell time approximately 12 seconds. For moderate control panty garments, the fusing press temperature should be between about 333 F. and about 337 F., the fusing pressure between about 38 psi and bout 42 psi, and fusing dwell time approximately 12 seconds. Analogously, for such firm control panty garments, the fusing press temperature should be between about 333 F. and about 337 F., the fusing pressure between about 48 psi and 52 psi, and the fusing dwell time about 12 seconds.

Thereafter, the base panel P which includes the control area, then travels further downstream on conveyor belt 30 to an unloading station 90 where it is removed from the conveyor belt 30, either manually or by the use of automatic removal devices (not shown).

The conveyor belt 30 then passes under the device 10 where its outer surface 30A is cleaned at belt cleaning station 95, preferably by the application of water, to remove any excess tack adhesive therefrom.

It will be further appreciated that the conveyor device 10 may be operated in the following manner. Tack adhesive is initially applied to the outer surface 30A of the conveyor belt 30 at the applicator station 12. The belt 30 thereupon indexes to a loading station 20 where the base panel P of the portion of the garment to be processed is placed on the conveyor belt 30 at a predetermined position and orientation through pattern exposures 26 in the loading fixture 24.

The conveyor belt 30 is then indexed downstream to the printing station 40 where the garment adhesive in a powdered state is screen printed onto the base panel P in a predetermined pattern as determined by the pattern exposures 45 in the printing screen 44. The conveyor belt 30 then indexes to a staging area 50 and later to a drying oven 60 where the garment adhesive is cured for approximately 10-15 seconds.

Conveyor belt 30 then travels further downstream to loading station 70 where the base panel P remains until cooled to a temperature of about 90 F. to 110 F. and then a cover panel C is applied over the printed portion of the base panel P. The base panel P then travels to a fusing station 80 where the cover panel C is fused to the base panel P to form the control area on the base panel P. Thereafter, the base panel P including the control area is removed from the conveyor belt 30 at an unloading station 90 and then the belt is cleaned at cleaning station 95.

It will be appreciated that the above discussed apparatus and method can be effectively used to print adhesive on numerous garment types in a variety of patterns.

Figure 4:
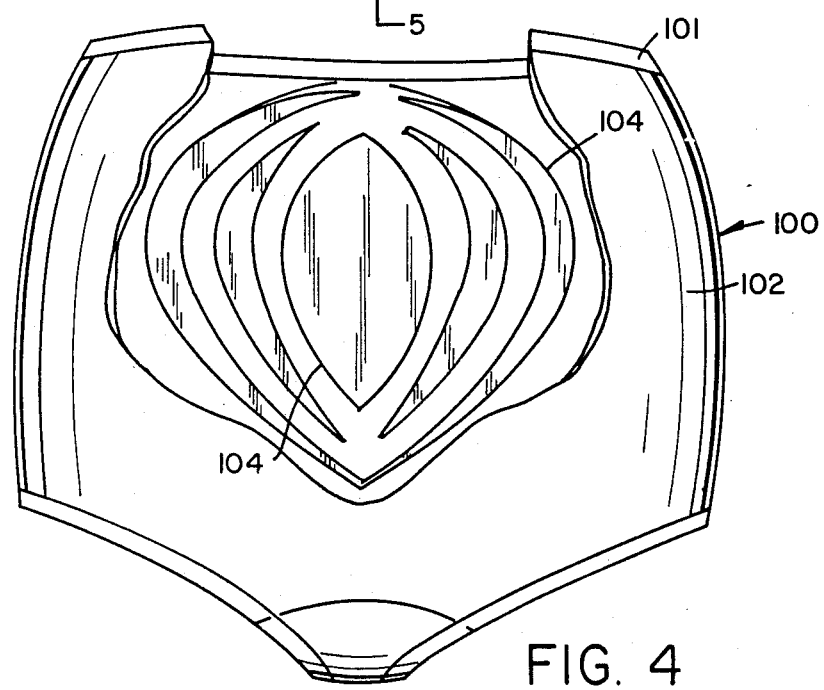
FIG. 4 is a cutaway view of the panty of FIG. 3.

FIGS. 3-5 illustrate a stretchable panty, such as woman's panty, having portions supported by the selective application of a powdered garment adhesive applied in accordance with the method and apparatus of the present invention.

In particular, the woman's panty 100 includes a waistband 101 and a body portion or base panel 102. A powdered hot melt garment adhesive 104 has been selectively applied to the inner surface of the body portion 102 in a predetermined pattern. Also, a cover panel 106 is provided. The adhesive 104 acts to fuse together the body panel 102 and the cover panel 106 thus forming a control panel or control area in the finished garment with the adhesive providing an aesthetically attractive appearance.

It is important to realize that the selection of fabric, the type and amount of the adhesive, and the configuration of the control area, dictate the amount or type of control achieved and the ability to provide a pleasing aesthetic effect.

The fabric selected must provide the desired around-the-body control i.e., the around-the-body control desired for the specific garment, i.e., light, moderate and firm control panty garment. Today, most panties are made from woven or knit synthetic fibers which possess a certain amount of stretch yet possess good hand and provide the desired around-the-body control. In particular, such panties are normally knit with a combination of nylon, such as 40 denier, 17 filament yarn, and an elastomeric material, such as 30 denier Spandex yarn. Generally, for all fiber types, the nylon should be provided in an amount between about 75% and about 90% and the elastomeric material in an amount between about 10% and about 25%.

It has been found that in applications where only minimal control or support is sought, the nylon should be included in an amount between about 85% and about 90% and the elastomeric material in an amount between about 10% and about 15%. In applications where moderate control is desired, the nylon should be included in an amount between about 83% and about 87% and the elastomeric material in an amount between about 13% and about 17%. Where firm control is desired, the nylon should be included in an amount between about 77% and about 81% and the elastomeric material in an amount between about 19% and about 23%.

The fabric thickness may also vary according to the type of control panty. For example, the thickness of both the base panel and the cover panel for a moderate control panty should be approximately 0.018", plus or minus 0.002". In a firm control panty, the fabric thickness for both panels should be approximately 0.021", plus or minus 0.002". In a light control panty, the fabric thickness of the base panel should be approximately 0.018", plus or minus 0.002" while the thickness of the cover panel should be approximately 0.021", plus or minus 0.002".

The garment adhesive should be a copolymer adhesive, prefereably either a copolyamide hot melt powdered adhesive or a copolyester hot melt powdered adhesive of the types discussed above.

It has been found that for optimum performance and to produce optimum aesthetic effect, the thickness of the adhesive, i.e., the height of the adhesive layer, after heat setting in the drying oven should be between about 0.012 to about 0.018 inches. For the light control panty, it is preferred that the thickness of the adhesive be between about 0.011 and about 0.014 inches. Also, in the moderate control panty garment, the thickness of the adhesive should be between about 0.013 and about 0.016 inches and, in the firm control panty garment, the thickness should be between about 0.015 and about 0.018 inches. Also, it has been found that the amount of adhesive in the control area for the light control panty should be approximately 1.0 gram, approximately 1.3 grams for the moderate control panty and, for the firm control panty between about 2.1 to 2.4 grams. It should be noted, however, that for all panty types, the thickness of the adhesive in the finished panty should be between about 0.001" and about 0.003".

It should also be found that for optimal performance in the finished panty, the thickness of the control area should generally be between about 0.035 and 0.047 inches, although such thickness will vary depending upon the amount of control required. For example, the thickness of the control area in the light control panty should be between about 0.035 and about 0.039 inches, the thickness of the control area in the moderate control panty should be between about 0.039 and about 0.043 inches, and the thickness of the control area in the firm control panty should be between about 0.043 and about 0.047 inches.

The weight of the adhesive material in the control area as a weight percentage of the weight of the overall front base panel (seam to seam), for a light control panty was between 28% and 38% and, for a firm control panty, was between about 36% and about 39%. For a moderate control panty, the weight percentage of the adhesive was between about 26% and about 28%. Preliminary tests measuring the area of the control area versus the overall front panel (seam to seam) for a light control panty was between about 31% and about 39%, yet for a moderate control panty was between about 32% and about 48% and, for a firm control panty, was between about 29% and about 37%. This test data results supports the importance of the specific configurations of the control areas taught in FIGS. 6A-6C and the shape of the adhesive in the control areas.

It has been found that when the adhesive is applied in a dot pattern, a lesser degree of control is achieved than when the adhesive is applied in a bar shape pattern which pattern, in turn, generally provides a lesser degree of control than when the adhesive is applied in a block shape pattern. In the present invention, the configuration of the controlled area was achieved by applying the adhesive in a unique combination of dots, bars and/or blocks to create an overall configuration which not only provides the level of control desired, i.e., light, moderate or firm, but provides an aesthetically attractive appearance in the control area and the overall garment.

FIGS. 6A-6C provide configurations or shapes for the control areas when applied to panties, with the configuration in FIG. 6A being intended to provide a minimal (light) degree of control for the wearer. The configuration shown in FIG. 6B is intended to provide a moderate degree of control for the wearer and the configuration shown in FIG. 6C is intended to provide a firm degree of control for the wearer.

In FIG. 6A, a V-shaped control area was selected to both achieve a light degree of control and provide a sleek configuration normally associated with light control panty garments. It is important to note that in the control area of a panty, there is a portion which is known as the control zone. Specifically, in the control zone, the wearer's tummy exerts the greatest degree of test pressure on the garment. Referring to FIG. 6A, this zone is defined as that portion between upper support line A—A, which is approximately 2 to 3 inches below the waistline (line X—X) of the wearer, and a lower support line A'—A'. It is important to appreciate that in the portion between the wearer's waistline X—X and the upper support line A—A, support or control is not important. In fact, the configuration of the control area in that portion is primarily for aesthetic purposes. However, in the control zone, i.e., the portion between the upper support line A—A and the lower support line A'—A', the configuration and location of the control area is critical in order to provide the desired control for a given fabric and adhesive.

When the adhesive is applied in a dot pattern within a V-shaped bar configuration, as shown in FIG. 6A, a light degree of control is achieved. Also, the V-shaped configuration further serves to provide the sleek aesthetic overall appearance which is desired at this control level.

In the control area shown in FIG. 6B, which is intended for use in a moderate control panty, the garment adhesive is applied in a pattern which includes of a combination of dots and scalloped bars. The overall scalloped pattern provides an aesthetic impression which has been identified with moderate control panty garments, yet the proportion and placement of the adhesive in the dot and bar pattern in the control area between the upper and lower support lines A—A and A'—A', respectively, provides the desired control.

Analogously, in the control area shown in FIG. 6C which is for a firm control panty, the adhesive is applied in spherical blocks. The spherical shape is identifiable with a firm control garment. It should be noted that in the area between waistline X—X and upper support line A—A, this firm control area appears to have less adhesive than the light and moderate control areas, yet in the control zone, i.e., between the upper and lower support lines A—A and A'A', respectively, there is provided more control than in the control zones of the light and moderate control panties of FIGS. 6B and 6C, respectively.

Consequently, all such configurations selected not only achieve the desired control but provide an overall pleasing appearance. Moreover, the use of adhesive, which is visible through the base panel P and cover panel C of the garment, provides an extremely aesthetically pleasing effect.

Further, tests have been run measuring the around-the-body control in light, moderate and firm control panties made according to the present invention as compared to moderate and firm support girdles and panties, some having control reinforcement panels. Other tests have been run measuring the control area of the same panties of the present invention versus the analogous portion (defined as the front of the panty) of the same moderate and firm support girdles and panties.

In the around-the-body control tests, it was found that moderate and firm support girdles require 16 to 34 lbs. before they reach the optimum around-the-body control point on the wearer, while moderate and firm panties require 6 to 11 lbs. The firm and moderate control panties of the present invention require 11 to 12 lbs. and 7 to 8 lbs., respectively, which basically falls within the range of the tested conventional moderate and firm support panties and, as expected, was not as good as the tested conventional firm and moderate support girdles. Likewise, the light control panty of the present invention required approximately 5 lbs. which again is basically as expected for a light support panty.

However, the control zone tests provided the following results. The conventional firm and moderate support girdles and panties measured approximately 7 to 9½ ozs. and 2½ to 5½ ozs., respectively, while the firm control panty of the present invention measured 8 to 9 ozs. Thus, these tests illustrate that the control zone and area of the firm control panty of the present invention provides as much control as moderate and firm support girdles and much greater control than conventional moderate and firm support panties. Also, the moderate control panty of the present invention measured approximately 5 to 5½ ozs. which was placing on the very high side of the tested conventional moderate and firm support panties. Further, the light control panty of the present invention measured approximately 3 to 4 ozs., which was well within the support provided by the tested conventional moderate and firm support panties.

Thus, the tests show that the panties made in accordance with the present invention provide the around-the-body control of conventional analogous type panties, yet superior control in the tummy area when compared to similar conventional panties. Accordingly, the fit, hand and around-the-body performance of the panty of the present invention has not in any way been sacrificed, yet superior control or support in the tummy area has been achieved, while still providing an aesthetically pleasing appearance.

Figure 7A:
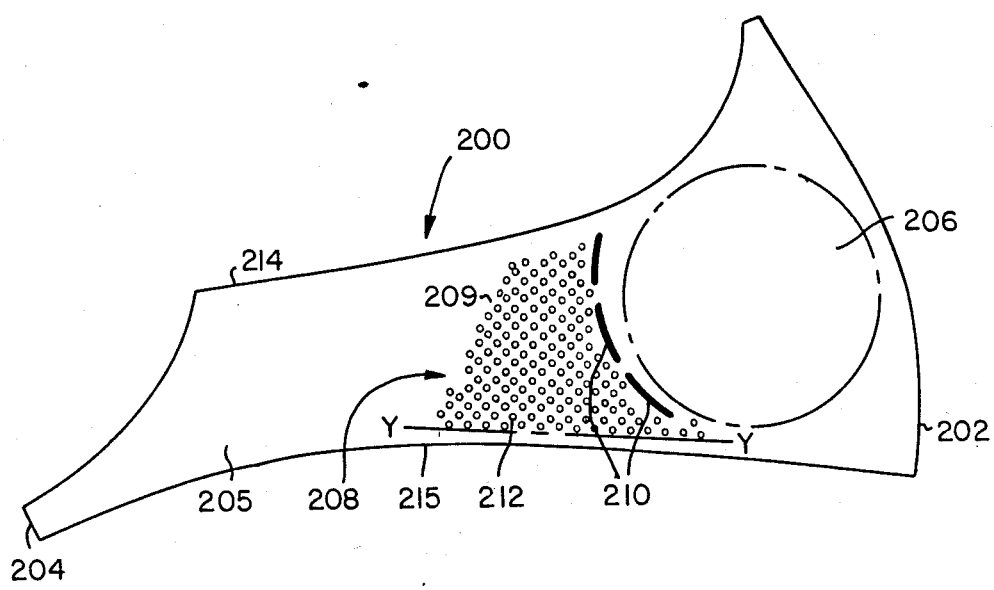
FIGS. 7A–7B is a front view of a portion of a conventional brassiere having selectively supported portions in aesthetically pleasing patterns produced according to the teachings of the present invention.
Figure 7B:
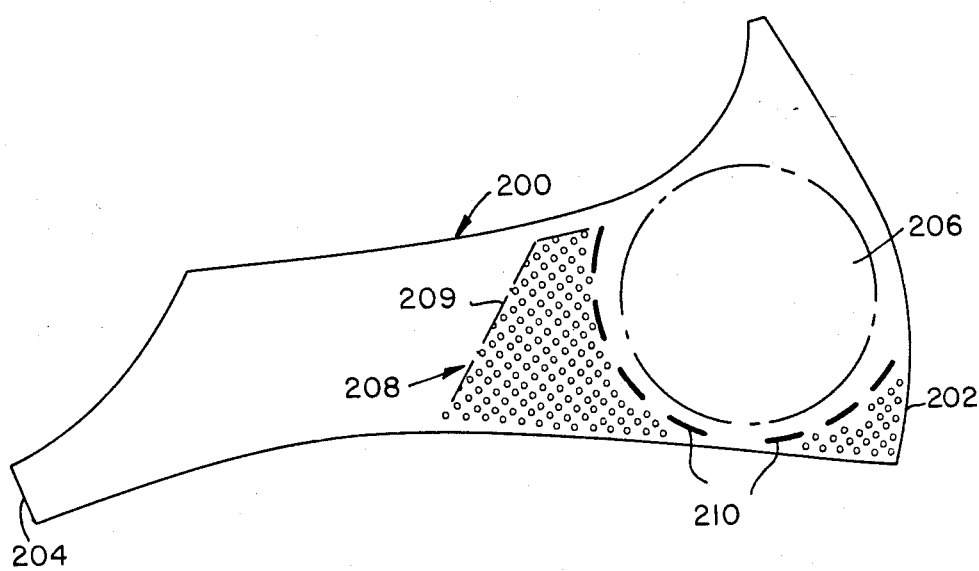

The teachings of the present invention have also been applied to brassieres, particularly brassieres made of stretchable or elastic materials. Referring to FIGS. 7A and 7B, there is shown approximately one half of a brassiere frame, i.e., a dorsal panel 200, extending from the center portion 202 to the terminus 204 where a hook-and-eye fastener (not shown) may be placed. The dorsal panel 200 has a breast cup portion 206.

As shown in FIG. 7A, the control area 208 (made of a brassiere frame base panel, powdered adhesive and cover panel in accordance with the teachings of the present invention), is provided adjacent the breast cup portion 206 and extends toward the terminus 204, with the outer limit of the dots of the control area 208 being defined by a planar edge or line of dots 209. The configuration of the panel is basically of a trapezoidal shape. Significantly, the adhesive is applied within the control area 208 in a pattern including a plurality of spaced or separated bars 210 and a plurality of dots 212 with the bars 210 located about the perimeter of the breast cup portion 206. It has been found that the spaced bars provide control yet sufficient flexibility so as to support, in a comfortable fashion, the breast of a wearer. Further, the dots provide a transition between the bars and the remainder 205 or unsupported portion of the dorsal panel. Specifically, the control area flattens the side of the bust to provide shaping, a feature desired in brassieres, while also reducing the stretch so as to provide control in the area adjacent the breast cup of the brassiere. It has also been found that this combination of the bars 210 and dots 212 shown in FIG. 7A is critical so as to provide a garment which is resistant to collapsing or wrinkling yet which provides a definite degree of control in an aesthetically pleasing manner.

Line 209 is significant since it serves as a transition between the stretch fabric in the remainder 205 of the dorsal panel 200 and the plurality of dots 212 in the control area 208. It is important to note that in order to avoid collapsing in the transitional plane between the dots 212 of the control area 208 and the remainder 205 of the dorsal panel 200, line 209 should be pitched. The pitch of line 209 is, in part, dictated by the fabric but, primarily, by the opposing stretch actions of the top 214 and the base 215 of the dorsal panel 200. Specifically, the pitch of line 209 functions to coordinate the opposing stretch actions of the top 214 and the base 215 so as to eliminate such collapsing. It has been found that the angle between line 209 and the horizontal plane (line Y—Y) of the base of the control area 208 should be between about 60 degrees and about 70 degrees and, preferably, 66½ degrees.

FIG. 7B depicts an identical portion of the dorsal panel 200 as shown in FIG. 7A, however, the control area 208 assumes a general U-shape configuration about the lower and side perimeter of the breast cup portion 206. Specifically, in the area positioned between the breast cup portion 206 and the center portion 202, the control area 208 provides support, separation and shaping, without the need for a separate support element. By such configuration, greater control or support is provided in the brassiere frame of FIG. 7A and, specifically, along the outer perimeter of the breast cup portion 206. As in FIG. 7A, it is important that the control area 208 be configured so that its spaced bars or blocks are positioned adjacent to the breast cup portion 206. The plurality of dots provides a transition from the bars 210 to the remainder 205 of the dorsal panel 200 so as to provide the shaping desired in the breast cup portion 206.

It is understood that the incorporation of the control area in a garment made according to the teachings of the present invention does not in any way irritate the wearer. It is anticipated that additional applications for a control/support/shaping of the hot melt powdered adhesive control areas in brassieres may include applications in the hook-and-eye tape area, in the lower band, and at the top and back of the brassiere, and similarly, in the midriff portion of a longline brassiere, as a replacement for its side stays, and under the back.

The use of such patterns are also anticipated in girdles, pantyhose, swimsuits, bodysuits, leotards, stretchpants, knit camisoles and half and full slips with the possible use in such garments being, for example, under and on the sides of the bust; in the stomach area; the derriere area; down the length of the sides; around the waist; in the lower back; in the straps in the legs and in the midriff.

Other items where the use of the control areas is anticipated are at the ankle and at the toe portions in socks and stockings and as an athletic supporter in men's swimwear.

The present invention may, of course, be carried out in other specific ways than those set forth herein without departing from the spirit and essential characteristics of the present invention. The present embodiments are, therefore, to be considered in all respects as illustrative and not restrictive, and to provide for all changes coming within the meaning and equivalency range the appended claims are intended to embrace.

Wherefore we claim:

1. A method for applying a powdered adhesive to a selected portion of a garment, said method comprising the steps of:
   a. providing a continuous conveyor system;
   b. loading said selected garment portion at a predetermined position on said conveyor system;
   c. directly applying the powdered adhesive to said selected garment portion in a predetermined pattern;
   d. curing the powdered adhesive;
   e. positioning a cover panel over the powdered adhesive on said garment;
   f. fusing said cover panel to said selected garment portion to form a reinforced composite; and
   g. removing said reinforced composite from said coveyor system.

2. A method for applying a powdered adhesive to a selected portion of a garment, said method comprising the steps of:
   a. providing a continuous conveyor system;
   b. applying a tack adhesive to an outer surface of said conveyor system;
   c. loading said portion at a predetermined position on said conveyor system;
   d. applying the powdered adhesive to said portion in a predetermined pattern;
   e. curing the powdered adhesive;
   f. positioning a cover panel over the powdered adhesive on said garment;
   g. fusing said cover panel to said portion; and
   h. removing said portion from said conveyor system.

3. The method of claim 1, wherein said step (b) comprises placing said selected portion of said garment on a loading member having at least one positioning pattern which is complimentarily configured with respect to said selected garment portion and positioning said loading member on said conveyor system.

4. The method of claim 1, wherein said step (c) comprises screen printing said adhesive to said portion at a screen printing station.

5. The method of claim 1, wherein said step (d) comprises curing in a drying oven at a temperature between about 290 F. and about 320 F.

6. The method of claim 1, wherein said step (f) comprises fusing said cover panel to said portion in a fusing press at a temperature between about 300 F. and about 350 F. and at a pressure between about 25 psi and about 75 psi.

7. The method of claim 1, further including prior to step (f) the step of cooling said portion to a temperature of between about 90 F. to about 110 F.

8. An apparatus for applying a thermoplastic hot melt powdered adhesive to a selected portion of a garment, said apparatus comprising:
   a continuous conveyor system including a continuous conveyor belt;
   an applicator station adapted to apply a tack adhesive to an outer surface of said conveyor belt;
   a loading station including a loading fixture provided above said conveyor belt, said loading fixture being adapted to orient said portion of said garment on said conveyor belt;
   a printing station for printing the powdered adhesive onto said portion of said garment in a predetermined pattern, said printing station including a printing screen containing at least one pattern exposure in said predetermined pattern through which the powdered adhesive may be applied directly to said portion of said garment;
   a drying oven for curing the powdered adhesive on said portion of said garment;
   a loading station for applying a cover panel over the cured adhesive; and
   a fusing station for fusing said cover panel to said portion of said garment at elevated temperature and pressure.

9. The apparatus of claim 8, wherein said loading fixture includes at least one complimentary pattern position provided thereon of a complimentary size and shape to said selected portion through which said selected portions may be positioned directly on said conveyor belt.

10. The apparatus of claim 8, wherein said printing station includes a screen printing frame adapted to support a printing screen having at least one pattern exposure in said predetermined pattern, means for introducing the powdered adhesive into said frame, and means for forcing the powdered adhesive through said pattern exposure and thereby directly applying the powdered adhesive to said selected portion of said garment in said predetermined pattern.

11. The apparatus of claim 10, wherein said means for forcing comprises at least one pair of reciprocating doctor blades, one of said blades being adapted to spread the powdered adhesive on one stroke and said other blade being adapted to force the powdered adhesive through said at least one pattern exposure on the return stroke

* * * * *